US010981569B2

United States Patent
Hashimoto et al.

(10) Patent No.: US 10,981,569 B2
(45) Date of Patent: *Apr. 20, 2021

(54) AUTONOMOUS DRIVING SYSTEM

(71) Applicant: TOYOTA JIDOSHA KABUSHIKI KAISHA, Toyota (JP)

(72) Inventors: Ryuta Hashimoto, Susono (JP); Hiroki Fukuda, Sunto-gun (JP); Akira Ito, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 234 days.

This patent is subject to a terminal disclaimer.

(21) Appl. No.: 16/135,384

(22) Filed: Sep. 19, 2018

(65) Prior Publication Data
US 2019/0143983 A1 May 16, 2019

(30) Foreign Application Priority Data
Nov. 15, 2017 (JP) .............................. JP2017-219865

(51) Int. Cl.
*B60W 30/18* (2012.01)
*B60W 50/10* (2012.01)
*G05D 1/00* (2006.01)

(52) U.S. Cl.
CPC ...... *B60W 30/18163* (2013.01); *B60W 50/10* (2013.01); *G05D 1/0088* (2013.01);
(Continued)

(58) Field of Classification Search
CPC .......... B60W 30/18163; B60W 50/10; B60W 2554/801; B60W 2520/10;
(Continued)

(56) References Cited

U.S. PATENT DOCUMENTS 10,266,180 B1* 4/2019 Fields ............... G06Q 30/0207
2014/0032017 A1* 1/2014 Anderson ............... G05D 1/00
701/3
(Continued)

FOREIGN PATENT DOCUMENTS

| JP | 2016-2892 A | 1/2016 |
| JP | 2017-178068 A | 10/2017 |
| JP | 2018-203121 A | 12/2018 |

OTHER PUBLICATIONS

Office Action dated May 29, 2020 in U.S. Appl. No. 16/132,660.
(Continued)

*Primary Examiner* — Hunter B Lonsberry
*Assistant Examiner* — Daniel M. Robert
(74) *Attorney, Agent, or Firm* — Sughrue Mion, PLLC

(57) ABSTRACT

An autonomous driving system includes a lane change control device that performs lane change control for making a lane change from a first lane to a second lane during autonomous driving of a vehicle. From start to completion of the lane change control, the lane change control device determines whether or not a driver's operation is performed as an abort request operation that requests to abort the lane change control. Specifically, the lane change control device: calculates abort necessity level indicating necessity to abort the lane change control, based on driving environment information indicating driving environment for the vehicle; sets criterion for determination such that the criterion becomes more easily satisfied as the abort necessity level increases; and when the driver's operation satisfies the criterion for determination, determines that the driver's operation is performed as the abort request operation.

8 Claims, 15 Drawing Sheets

(52) U.S. Cl.
CPC .............. *B60W 2554/801* (2020.02); *G05D 2201/0213* (2013.01)

(58) Field of Classification Search
CPC ......... B60W 2554/80; B60W 2556/50; B60W 2554/00; B60W 10/06; B60W 10/20; B60W 10/18; G05D 1/0088; G05D 2201/0213

See application file for complete search history.

(56) References Cited

U.S. PATENT DOCUMENTS

| | | | |
|---|---|---|---|
| 2015/0151725 A1* | 6/2015 | Clarke ................ | B60W 30/165 701/28 |
| 2015/0360721 A1 | 12/2015 | Matsuno et al. | |
| 2016/0091896 A1* | 3/2016 | Maruyama ............ | B60W 50/10 701/23 |
| 2019/0004513 A1* | 1/2019 | Chiba .............. | G08G 1/096725 |
| 2019/0084572 A1 | 3/2019 | Oishi et al. | |
| 2019/0143982 A1 | 5/2019 | Hashimoto et al. | |
| 2020/0089180 A1* | 3/2020 | Kanekawa ......... | G05B 19/0428 |

OTHER PUBLICATIONS

Office Action dated Oct. 13, 2020 from the United States Patent and Trademark Office in U.S. Appl. No. 16/132,660.
Notice of Allowance dated Jan. 27, 2021 in U.S. Appl. No. 16/132,660.

* cited by examiner

| PURPOSE OF LANE CHANGE | ABORT NECESSITY LEVEL X | CRITERION FOR DETERMINATION |
|---|---|---|
| LANE MERGING | DECREASE | STRICTER |
| LANE BRANCHING | DECREASE | STRICTER |
| OBSTACLE AVOIDANCE | DECREASE | STRICTER |

Fig. 9

AUTONOMOUS DRIVING SYSTEM

BACKGROUND

Technical Field

The present disclosure relates to an autonomous driving technique for a vehicle. In particular, the present disclosure relates to lane change control in autonomous driving.

Background Art

Patent Literature 1 discloses a technique relating to overtaking control during autonomous driving. According to the technique, an autonomous driving system determines not to execute the overtaking control or to abort the overtaking control, depending on a situation of a following vehicle and so forth.

LIST OF RELATED ART

Patent Literature 1: Japanese Laid-Open Patent Publication No. 2016-002892

SUMMARY

Let us consider a case where an autonomous driving system plans a lane change and performs lane change control. In this case, there is a possibility that a driver has an intention to abort the lane change control by the autonomous driving system. However, according to the technique disclosed in Patent Literature 1 described above, it is not possible to reflect the driver's intention to abort in the lane change control by the autonomous driving system.

An object of the present disclosure is to provide a technique that can reflect a driver's intention to abort in lane change control by an autonomous driving system.

A first disclosure provides an autonomous driving system mounted on a vehicle.

The autonomous driving system includes:

a lane change control device that performs lane change control for making a lane change from a first lane to a second lane during autonomous driving of the vehicle; and a driver's operation detection device that detects a driver's operation by a driver of the vehicle.

The lane change control device performs:

abort request detection processing that, from start to completion of the lane change control, determines whether or not the driver's operation is performed as an abort request operation that requests to abort the lane change control; and abort processing that, when the abort request operation is performed and an abort permission condition is satisfied, aborts the lane change control and makes the vehicle travel in the first lane.

In the abort request detection processing, the lane change control device:

calculates abort necessity level indicating necessity to abort the lane change control, based on driving environment information indicating driving environment for the vehicle;

sets criterion for determination such that the criterion for determination becomes more easily satisfied as the abort necessity level increases; and when the driver's operation satisfies the criterion for determination, determines that the driver's operation is performed as the abort request operation.

A second disclosure further has the following feature in addition to the first disclosure.

Based on the driving environment information, the lane change control device plans the lane change and calculates the abort necessity level based on a purpose of the planned lane change.

The lane change control device decreases the abort necessity level when the purpose is any of lane merging, lane branching, and obstacle avoidance.

A third disclosure further has the following feature in addition to the first or second disclosure.

The driving environment information includes sensor-detected information indicating information of a surrounding vehicle detected by a sensor.

The lane change control device refers to the sensor-detected information to calculate the abort necessity level based on an inter-vehicle distance between the vehicle and the surrounding vehicle traveling in the second lane.

The lane change control device increases the abort necessity level when the inter-vehicle distance is equal to or less than a certain value.

A fourth disclosure further has the following feature in addition to any one of the first to third disclosures.

The driving environment information includes sensor-detected information indicating information of a surrounding vehicle detected by a sensor.

The lane change control device refers to the sensor-detected information to calculate the abort necessity level based on a relative speed between the vehicle and the surrounding vehicle traveling in the second lane.

The lane change control device increases the abort necessity level when the relative speed is equal to or higher than a certain value in a direction to decrease an inter-vehicle distance between the vehicle and the surrounding vehicle traveling in the second lane.

A fifth disclosure further has the following feature in addition to any one of the first to fourth disclosures.

The driving environment information includes sensor-detected information indicating information of a surrounding vehicle detected by a sensor.

The lane change control device refers to the sensor-detected information to calculate the abort necessity level based on a congestion level of the surrounding vehicle in the first lane.

The lane change control device decreases the abort necessity level when the congestion level is equal to or higher than a certain level.

A sixth disclosure further has the following feature in addition to any one of the first to fifth disclosures.

The lane change control includes:

steering control that moves the vehicle from the first lane toward the second lane; and preliminary control performed before the steering control.

During the preliminary control, the lane change control device decreases the abort necessity level.

A seventh disclosure further has the following feature in addition to any one of the first to sixth disclosures.

A direction from the second lane to the first lane is an abort direction.

The driver's operation detection device includes a steering wheel.

The abort request operation is to steer the steering wheel in the abort direction.

The criterion for determination is that a steering amount of a steering speed of the steering wheel exceeds a first determination threshold.

When making the criterion for determination more easily satisfied, the lane change control device decreases the first determination threshold.

An eighth disclosure further has the following feature in addition to any one of the first to sixth disclosures.

A direction from the second lane to the first lane is an abort direction.

The driver's operation detection device includes a turn signal lever.

The abort request operation is to operate the turn signal lever to indicate the abort direction.

The criterion for determination is that an operation duration time of the turn signal lever exceeds a second determination threshold.

When making the criterion for determination more easily satisfied, the lane change control device decreases the second determination threshold.

As described above, the autonomous driving system according to the present disclosure is configured to be able to handle the abort request operation by the driver from start to completion of the lane change control. As a result, the driver's intention to abort is reflected in the lane change control by the autonomous driving system. Furthermore, according to the present disclosure, the criterion used for determination of the abort request operation is changed depending on the abort necessity level indicating necessity to abort the lane change control.

The abort necessity level being high means that there is a reasonable reason for the driver to request to abort the lane change control. In this case, the criterion for determination is set to be "loose", that is, the criterion for determination is set to be more easily satisfied. As a result, a driver's operation becomes more easily determined as the abort request operation. Accordingly, it is possible to appropriately pick up the driver's intention to abort.

On the other hand, the abort necessity level being low means that it is highly necessary to continue the lane change control without aborting and also the driver is unlikely to request to abort the lane change control. In this case, the criterion for determination is set to be "strict", that is, the criterion for determination is set to be less easily satisfied. As a result, a driver's operation becomes less easily determined as the abort request operation. Accordingly, it is possible to appropriately continue the necessary lane change control. Furthermore, it is possible to suppress an error that a driver's operation which is not intended to abort the lane change control is erroneously determined as the abort request operation.

The features described above contribute to increase in usability and operability for the driver.

BRIEF DESCRIPTION OF DRAWINGS

FIG. 9 is a conceptual diagram for explaining a first example of a policy of calculating the abort necessity level in the embodiment of the present disclosure;

EMBODIMENTS

Embodiments of the present disclosure will be described below with reference to the attached drawings.

1. Outline

Figure 1:
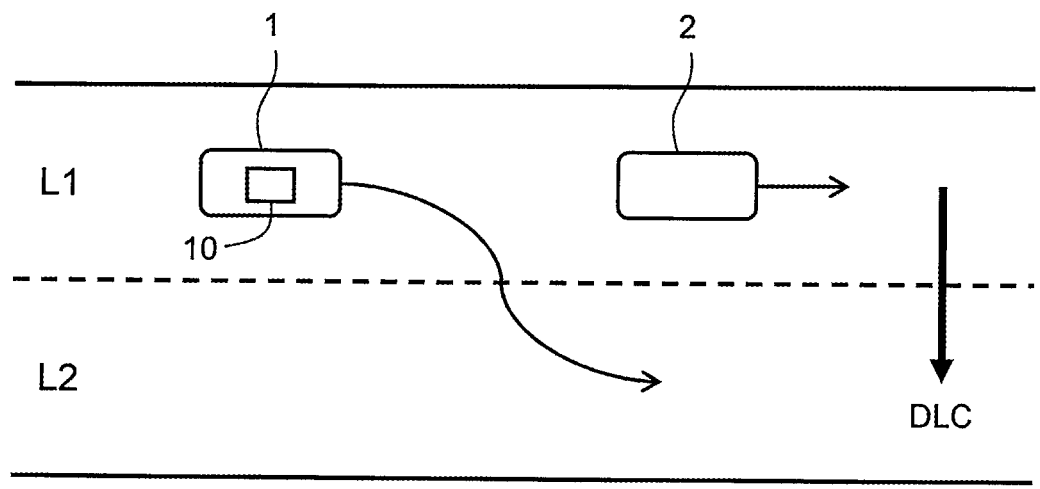
FIG. 1 is a conceptual diagram for explaining lane change control by an autonomous driving system according to an embodiment of the present disclosure.

FIG. 1 is a conceptual diagram for explaining lane change control by an autonomous driving system 10 according to the present embodiment. The autonomous driving system 10 is mounted on a vehicle 1 and controls autonomous driving of the vehicle 1. The autonomous driving control includes "lane change control" for changing a travel lane in which the vehicle 1 travels. For example, the autonomous driving system 10 performs the lane change control in order to overtake a preceding vehicle 2. A purpose of the lane change is exemplified not only by overtaking but also by lane merging, lane branching, obstacle avoidance, and so forth.

In the following description, the original travel lane before the lane change is referred to as a "first lane L1". The travel lane after the lane change, that is, a target lane of the lane change is referred to as a "second lane L2". That is, the autonomous driving system 10 performs the lane change control for making a lane change from the first lane L1 to the second lane L2 during the autonomous driving of the vehicle 1. A direction from the first lane L1 to the second lane L2 is hereinafter referred to as a "lane change direction DLC".

It should be noted that the lane change control according to the present embodiment is not limited only to steering control for moving the vehicle 1 from the first lane L1 to the second lane L2. For example, turn signal flashing before start of the steering control also is included in the lane change control according to the present embodiment. Moreover, positioning that accelerates or decelerates the vehicle 1 to move the vehicle 1 to a suitable position for the lane change before starting the steering control also is included in the lane change control according to the present embodiment. The turn signal flashing and the positioning performed before the steering control is hereinafter referred to as "preliminary control". It is also possible that the autonomous driving system 10 proposes execution of the lane change to a driver of the vehicle 1 and the driver approves the proposed lane change. In that case, a series of control performed after the driver's approval is included in the lane change control.

The autonomous driving system 10 according to the present embodiment is designed such that the driver can abort (cancel) the lane change control after start of the lane change control. An operation performed by the driver to request the autonomous driving system 10 to abort the lane change control is hereinafter referred to as an "abort request operation AR".

Figure 2:
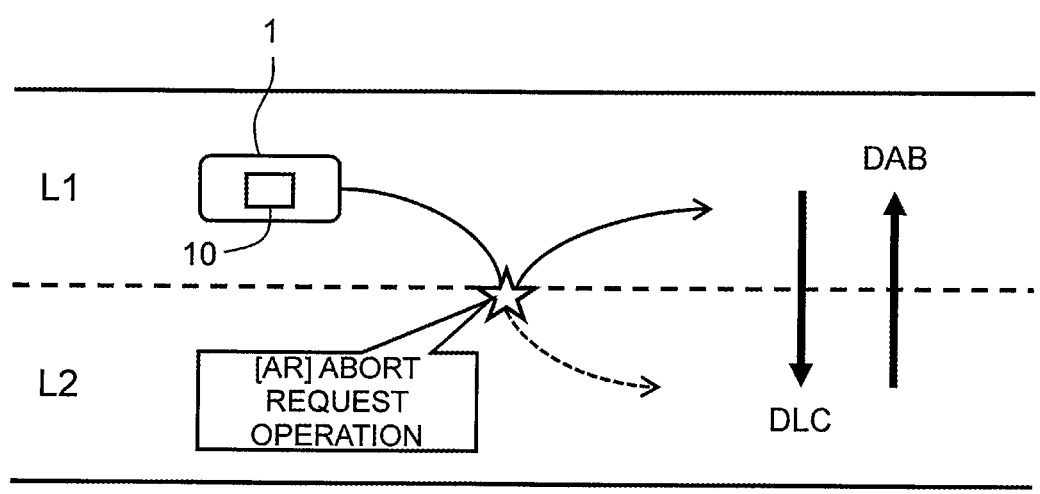
FIG. 2 is a conceptual diagram for explaining an abort request operation by a driver in the embodiment of the present disclosure.

FIG. 2 is a conceptual diagram for explaining the abort request operation AR by the driver. In FIG. 2, an "abort direction DAB" is a direction from the second lane L2 to the first lane L1, that is, opposite to the lane change direction DLC. As an example of the abort request operation AR, the driver operates a turn signal lever to indicate the abort direction DAB (i.e. the abort request operation AR=turn signal lever operation). As another example, the driver steers a steering wheel in the abort direction DAB (i.e. the abort request operation AR=steering operation). From start to completion of the lane change control, the autonomous driving system 10 determines whether or not the abort request operation AR is performed by the driver.

Figure 3:
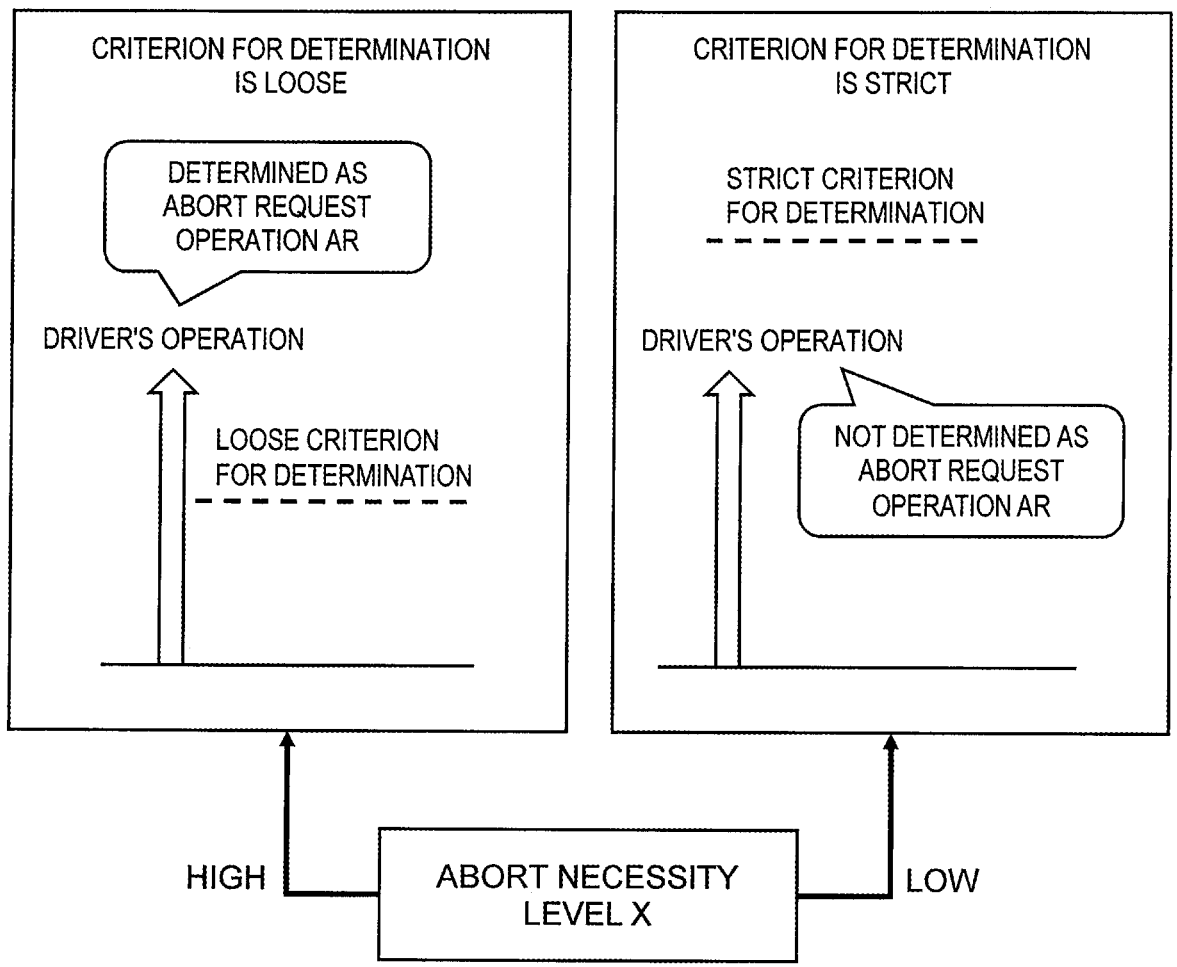
FIG. 3 is a conceptual diagram for explaining a method of determining the abort request operation in the embodiment of the present disclosure.

FIG. 3 is a conceptual diagram for explaining a method of determining the abort request operation AR. According to the present embodiment, a "criterion" for determining a driver's operation as the abort request operation AR is provided. When a driver's operation satisfies the criterion for determination, the driver's operation is determined as the abort request operation AR. On the other hand, when a driver's operation does not satisfy the criterion for determination, the driver's operation is not determined as the abort request operation AR.

For example, a method of the abort request operation AR by the use of a steering wheel is to steer the steering wheel in the abort direction DAB. In this case, the criterion for determination is that "a steering amount or a steering speed of the steering wheel exceeds a first determination threshold ARth1". That is, when the steering amount or the steering speed of the steering wheel in the abort direction DAB exceeds the first determination threshold ARth1, the steering operation is determined as the abort request operation AR.

As another example, a method of the abort request operation AR by the use of a turn signal lever is to operate the turn signal lever to indicate the abort direction DAB. In this case, the criterion for determination is that "an operation duration time of the turn signal lever exceeds a second determination threshold ARth2". That is, when the operation duration time of the turn signal lever indicating the abort direction DAB exceeds the second determination threshold ARth2, the turn signal lever operation is determined as the abort request operation AR.

Here, it is not preferable that a driver's operation which is not intended to abort the lane change control is erroneously determined as the abort request operation AR. For example, let us consider a case where the driver steers the steering wheel in the abort direction DAB during the lane change control necessary for arriving at a destination. However, it is generally unlikely that the driver requests to abort the lane change control necessary for arriving at the destination. It may be likely that the steering operation is not intended to abort the lane change control but to merely fine-tune a travel path. It is not preferable that such the steering operation is erroneously determined as the abort request operation AR.

On the other hand, when there is a reasonable reason to abort the lane change control by the autonomous driving system 10, it is considered that the abort request operation AR by the driver should be accepted proactively. For example, when a high-speed vehicle in the second lane L2 approaches the vehicle 1 from behind during the vehicle 1 is moving from the first lane L1 to the second lane L2, the driver is likely to want to abort the lane change control. In this case, by proactively determining a driver's operation as the abort request operation AR, it is possible to appropriately pick up the driver's intention to abort.

In view of the above, according to the present embodiment, the criterion (the first determination threshold ARth1, the second determination threshold ARth2) used for determination of the abort request operation AR is not constant but changed depending on the situation. More specifically, the criterion for determination is variably set in terms of whether necessity to abort the lane change control by the autonomous driving system 10 is high or low. A parameter indicating the necessity to abort the lane change control is hereinafter referred to as an "abort necessity level X". It is possible to determine the abort necessity level X based on driving environment around the vehicle 1.

The abort necessity level X being high means that there is a reasonable reason for the driver to request to abort the lane change control. In this case, the criterion for determination is set to be "loose", that is, the criterion for determination is set to be more easily satisfied. In order to make the criterion for determination loose, the above-mentioned determination threshold (the first determination threshold ARth1, the second determination threshold ARth2) is decreased. As a result, a driver's operation becomes more easily determined as the abort request operation AR. Accordingly, it is possible to appropriately pick up the driver's intention to abort.

On the other hand, the abort necessity level X being low means that it is highly necessary to continue the lane change control without aborting and also the driver is unlikely to request to abort the lane change control. In this case, the criterion for determination is set to be "strict", that is, the criterion for determination is set to be less easily satisfied. In order to make the criterion for determination strict, the above-mentioned determination threshold (the first determination threshold ARth1, the second determination threshold ARth2) is increased. As a result, a driver's operation becomes less easily determined as the abort request operation AR. Accordingly, it is possible to appropriately continue the necessary lane change control. Furthermore, it is possible to suppress an error that the driver's operation which is not intended to abort the lane change control is erroneously determined as the abort request operation AR.

As described above, the autonomous driving system 10 according to the present embodiment is configured to be able to handle the abort request operation AR by the driver from start to completion of the lane change control. As a result, the driver's intention to abort is reflected in the lane change control by the autonomous driving system 10.

Furthermore, according to the present embodiment, the criterion used for determination of the abort request operation AR is changed depending on the abort necessity level X indicating the necessity to abort the lane change control. The criterion for determination becomes more easily satisfied as the abort necessity level X increases, which makes it possible to appropriately pick up the driver's intention to abort. Meanwhile, the criterion for determination becomes less easily satisfied as the abort necessity level X decreases, which makes it possible to appropriately continue the necessary lane change control. Furthermore, it is possible to suppress an error that a driver's operation which is not intended to abort the lane change control is erroneously determined as the abort request operation AR. These contribute to increase in usability and operability for the driver.

2. Configuration Example of Autonomous Driving System

Figure 4:
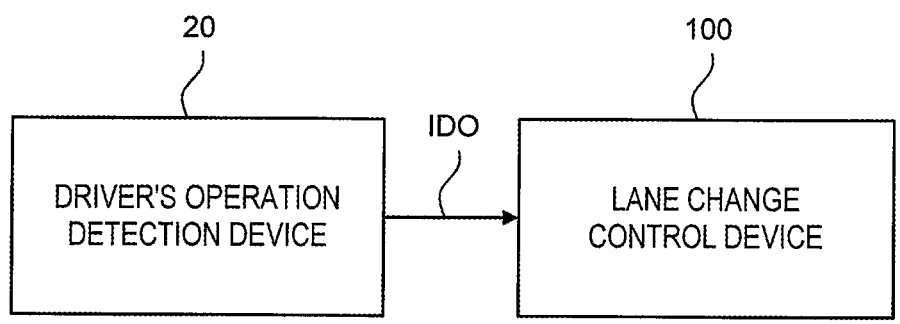
FIG. 4 is a block diagram schematically showing a configuration of the autonomous driving system according to the embodiment of the present disclosure.

FIG. 4 is a block diagram schematically showing a configuration of the autonomous driving system 10 according to the present embodiment. The autonomous driving system 10 mounted on the vehicle 1 includes a driver's operation detection device 20 and a lane change control device 100.

The driver's operation detection device 20 is a device for detecting an operation by the driver (hereinafter referred to as a "driver's operation"). More specifically, the driver's operation detection device 20 includes an operation member that the driver operates, and an operation sensor detecting that the operation member is operated. The operation member is exemplified by a turn signal lever and a steering wheel. The driver's operation detection device 20 detects the driver's operation based on the operation sensor and transmits information on the detected driver's operation, as driver's operation information IDO, to the lane change control device 100.

The driver's operation using the turn signal lever is the "turn signal lever operation". The operation sensor includes a sensor that detects the turn signal lever operation. The driver's operation detection device 20 transmits information indicating an operation direction of the turn signal lever, as the driver's operation information IDO, to the lane change control device 100. The driver's operation using the turn signal lever includes the abort request operation AR. More specifically, the abort request operation AR is to operate the turn signal lever to indicate the abort direction DAB.

The driver's operation using the steering wheel is the "steering operation". The operation sensor includes a steering angle sensor that detects a steering angle of the steering wheel. Based on a result of detection by the steering angle sensor, the driver's operation detection device 20 calculates a steering amount and a steering speed of the steering wheel. Then, the driver's operation detection device 20 transmits information on the calculated steering amount and steering speed, as the driver's operation information IDO, to the lane change control device 100. The driver's operation using the steering wheel includes the abort request operation AR. More specifically, the abort request operation AR is to steer the steering wheel in the abort direction DAB.

The lane change control device 100 performs the lane change control during the autonomous driving of the vehicle 1. From start to completion of the lane change control, the lane change control device 100 recognizes the driver's operation based on the driver's operation information IDO and determines whether or not the driver's operation is performed as the abort request operation AR. When the abort request operation AR is performed, the lane change control device 100 determines whether or not an abort permission condition is satisfied. When the abort permission condition is not satisfied, the lane change control device 100 continues the lane change control. On the other hand, when the abort permission condition is satisfied, the lane change control device 100 aborts the lane change control and makes the vehicle 1 travel in the first lane L1.

Figure 5:
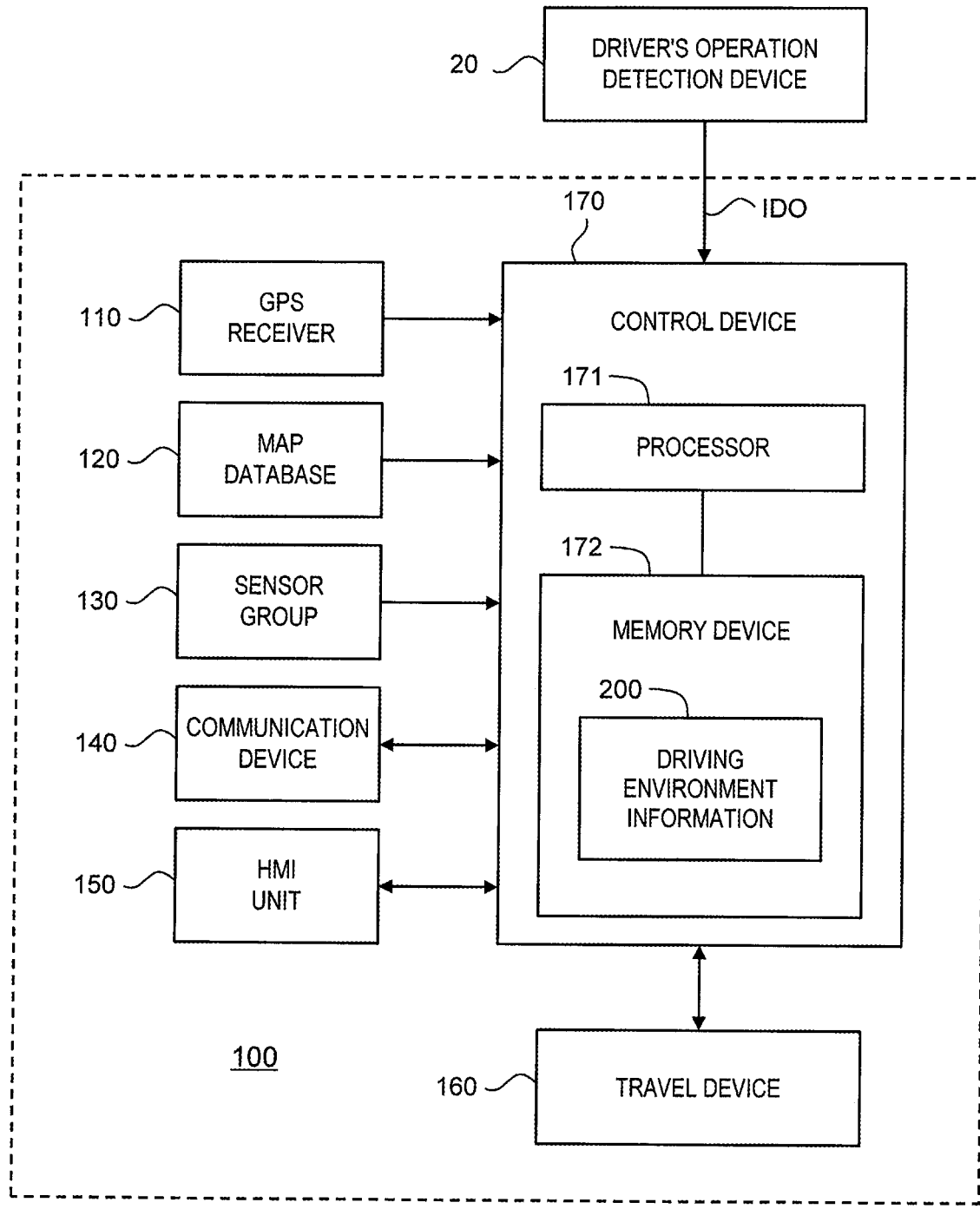
FIG. 5 is a block diagram showing a configuration example of a lane change control device according to the embodiment of the present disclosure.

FIG. 5 is a block diagram showing a configuration example of the lane change control device 100 according to the present embodiment. The lane change control device 100 is provided with a GPS (Global Positioning System) receiver 110, a map database 120, a sensor group 130, a communication device 140, an HMI (Human Machine Interface) unit 150, a travel device 160, and a control device 170.

The GPS receiver 110 receives signals transmitted from a plurality of GPS satellites and calculates a position and an orientation of the vehicle 1 based on the received signals.

Map information is recorded in the map database 120. The map information includes information of a lane geometry (i.e. lane position, lane shape, and lane orientation).

The sensor group 130 detects a situation around the vehicle 1 and a travel state of the vehicle 1. The sensor group 130 is exemplified by a LIDAR (Laser Imaging Detection and Ranging), a radar, a camera, a vehicle speed sensor, and the like. The LIDAR uses laser lights to detect a target around the vehicle 1. The radar uses radio waves to detect a target around the vehicle 1. The camera images a situation around the vehicle 1. The vehicle speed sensor detects a speed of the vehicle 1.

The communication device 140 communicates with the outside of the vehicle 1. For example, the communication device 140 performs a V2I communication (a vehicle-to-infrastructure communication) with a surrounding infrastructure. The communication device 140 may perform a V2V communication (a vehicle-to-vehicle communication) with a surrounding vehicle. In addition, the communication device 140 may communicate with a management server managing autonomous driving service through a communication network.

The HMI unit 150 is an interface for proving the driver with information and receiving information from the driver. More specifically, the HMI unit 150 includes an input device and an output device. The input device is exemplified by a touch panel, a switch, a microphone, and the like. The output device is exemplified by a display device, a speaker, and the like. The output device is, for example, used by the autonomous driving system 10 (the lane change control device 100) for proposing a lane change to the driver. The input device is used by the driver for approving or refusing the proposed lane change.

The travel device 160 includes a steering device, a driving device, a braking device, and so forth. The steering device turns wheels. The driving device is a power source that generates a driving force. The driving device is exemplified by an engine and an electric motor. The braking device generates a braking force.

The control device 170 controls the autonomous driving of the vehicle 1. The control device 170 is a microcomputer including a processor 171 and a memory device 172. The control device 170 is also called an ECU (Electronic Control Unit). The autonomous driving control by the control device 170 is achieved by the processor 171 executing a control program stored in the memory device 172.

More specifically, the control device 170 acquires information necessary for the autonomous driving control. The autonomous driving control requires information indicating driving environment for the vehicle 1, and the information is hereinafter referred to as "driving environment information 200". The driving environment information 200 is stored in the memory device 172, and read out and used as appropriate.

Figure 6:
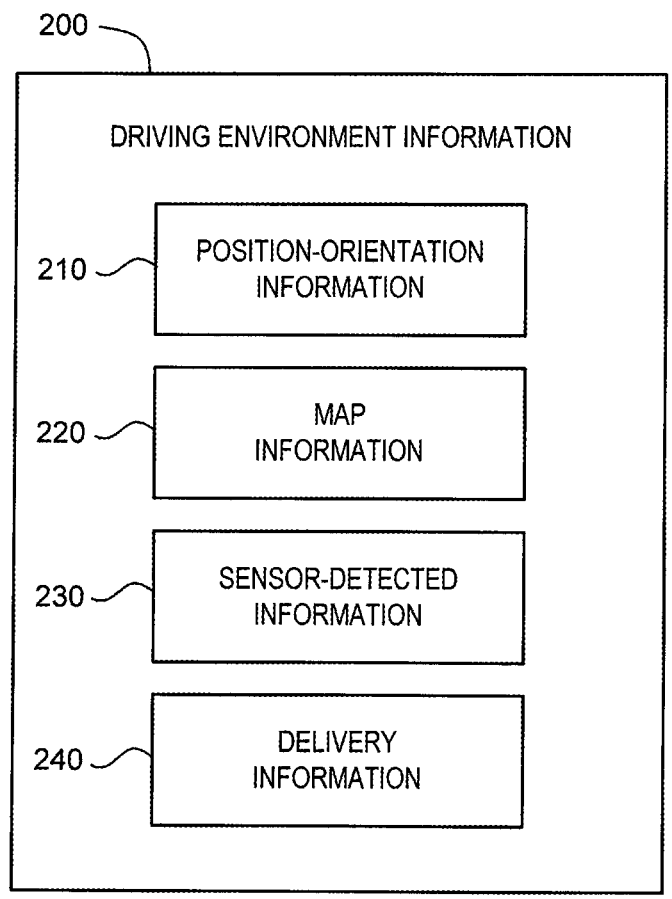
FIG. 6 is a block diagram showing an example of driving environment information used in the lane change control device according to the embodiment of the present disclosure.

FIG. 6 shows an example of the driving environment information 200 in the present embodiment. The driving environment information 200 includes position-orientation information 210, map information 220, sensor-detected information 230, and delivery information 240.

The position-orientation information 210 indicates the position and the orientation of the vehicle 1. The control device 170 acquires the position-orientation information 210 from the GPS receiver 110.

The map information 220 includes information of the lane geometry (i.e. lane position, lane shape, and lane orientation). The control device 170 acquires the map information 220 around the vehicle 1 based on the position-orientation information 210 and the map database 120. Based on the map information 220, the control device 170 can recognize lane merging, lane branching, intersections, and so forth.

The sensor-detected information 230 is information acquired based on a result of detection by the sensor group 130. More specifically, the sensor-detected information 230 includes target information regarding a target around the vehicle 1. The target around the vehicle 1 is exemplified by a surrounding vehicle, a pedestrian, a roadside structure, a white line, a traffic sign, and so forth. The target information includes a relative position, a relative speed, and the like of the detected target. In addition, the sensor-detected information 230 includes the vehicle speed detected by the vehicle speed sensor. The control device 170 acquires the sensor-detected information 230 based on the result of detection by the sensor group 130.

The delivery information 240 is information acquired through the communication device 140. For example, the delivery information 240 includes road traffic information (roadwork section information, accident information, traffic regulation information, traffic jam information, and the like) delivered from the infrastructure. The delivery information 240 may include information delivered from the management server managing the autonomous driving service. The control device 170 acquires the delivery information 240 by using the communication device 140 to communicate with the outside of the vehicle 1.

The control device 170 controls the autonomous driving of the vehicle 1 based on the driving environment information 200 indicating the driving environment. More specifically, the control device 170 creates a travel plan of the vehicle 1 based on the driving environment information 200. Then, the control device 170 controls the travel device 160 to make the vehicle 1 travel in accordance with the travel plan.

The autonomous driving control by the control device 170 includes the "lane change control" described above. Hereinafter, the lane change control by the lane change control device 100 (i.e. the control device 170) according to the present embodiment will be described in more detail.

3. Processing Flow of Lane Change Control

Figure 7:
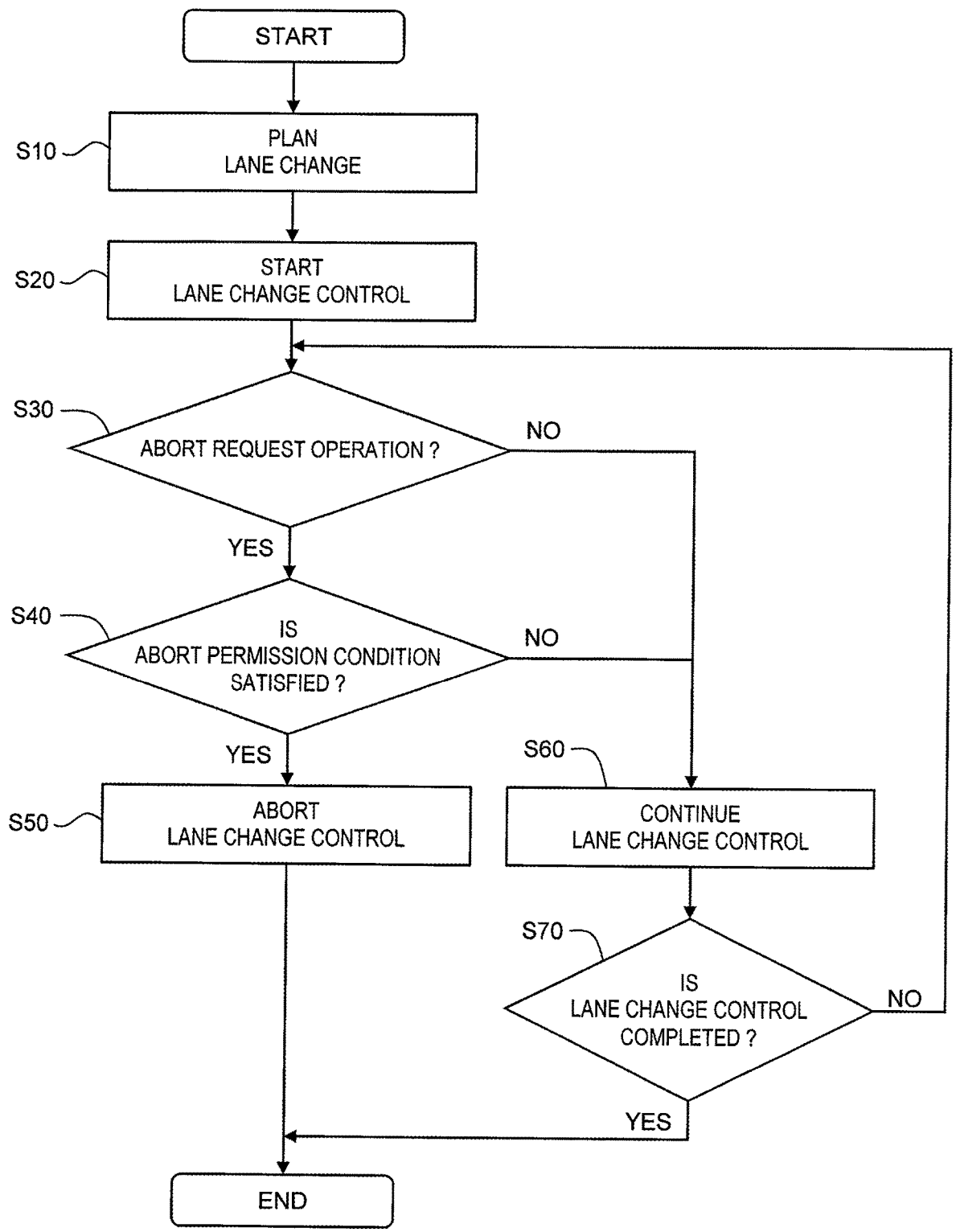
FIG. 7 is a flow chart showing lane change control processing by the lane change control device according to the embodiment of the present disclosure.

FIG. 7 is a flow chart showing lane change control processing by the lane change control device 100 according to the present embodiment.

3-1. Step S10

The lane change control device 100 plans a lane change based on the driving environment information 200. A purpose of the lane change includes lane merging, lane branching, obstacle avoidance, overtaking a preceding vehicle 2, and so forth.

When the purpose of the lane change is the lane merging, typically, the first lane L1 is a merge lane and the second lane L2 is a main line. Moreover, the lane merging includes a case where the first lane L1 (for example, a slower traffic lane) disappears in front. When the purpose of the lane change is the lane branching, typically, the first lane L1 is a main line and the second lane L2 is a branch lane leading to a destination. Moreover, the lane branching includes a case of making a lane change in advance to a lane adjacent to the branch lane in order to enter the branch lane in front. The lane change for the lane merging and the lane branching is planned based on the destination, the position-orientation information 210, and the map information 220.

The obstacle is exemplified by a roadwork section, an accident vehicle, and a merged section. The roadwork section and the accident vehicle can be recognized based on the delivery information 240 (the road traffic information) or the sensor-detected information 230 (the target information). The merged section can be recognized based on the map information 220. The preceding vehicle 2 as a target of the overtaking is determined based on the sensor-detected information 230 (the target information and the vehicle speed information).

3-2. Step S20

In order to achieve the lane change planned in Step S10, the lane change control device 100 starts the lane change control. Here, the lane change control is not limited only to the steering control for moving the vehicle 1 from the first lane L1 toward the second lane L2. The preliminary control such as the positioning (accelerating/decelerating) and the turn signal flashing before start of the steering control also is included in the lane change control. The lane change control device 100 controls the travel device 160 to perform the positioning and the steering control.

Before starting the lane change control, the lane change control device 100 may propose execution of the lance change to the driver through the output device of the HMI unit 150. In this case, the driver uses the input device of the HMI unit 150 to approve or refuse the proposed lane change.

3-3. Step S30 (Abort Request Detection Processing)

From start to completion of the lane change control, the lane change control device 100 performs abort request detection processing that determines whether or not the driver's operation by the driver is performed as the abort request operation AR. The abort request detection processing is performed based on the driving environment information 200 and the driver's operation information IDO received from the driver's operation detection device 20 described above. Details of Step S30 according to the present embodiment will be described later.

When it is determined that the abort request operation AR is performed (Step S30; Yes), the processing proceeds to Step S40. On the other hand, when it is not determined that the abort request operation AR is performed (Step S30; No), the processing proceeds to Step S60.

3-4. Step S40 (Condition Determination Processing)

The lane change control device 100 performs condition determination processing that determines whether or not an abort permission condition is satisfied. The abort permission condition is a condition for making a final judgment on whether or not to accept (comply with) the abort request from the driver. When the abort permission condition is satisfied (Step S40; Yes), the processing proceeds to Step S50. On the other hand, when the abort permission condition is not satisfied (Step S40; No), the processing proceeds to Step S60.

3-5. Step S50 (Abort Processing)

The lane change control device 100 aborts the lane change control. Then, the lane change control device 100 makes the vehicle 1 travel in the original first lane L1.

In particular, when the abort request operation AR is performed after the vehicle 1 overlaps the second lane L2 and when the abort permission condition is satisfied, the lane change control device 100 performs "return control". The return control is vehicle control that makes the vehicle 1 return from the second lane L2 to the original first lane L1.

3-6. Step S60 (Continuation Processing)

The lane change control device 100 continues the lane change control. After that, the processing proceeds to Step S70.

3-7. Step S70

The lane change control device 100 determines whether or not the lane change control is completed. When the lane change control is not yet completed (Step S70; No), the processing returns back to Step S30. When the lane change control is completed (Step S70; Yes), the processing flow shown in FIG. 7 ends.

4. Details of Step S30 (Abort Request Detection Processing)

Figure 8:
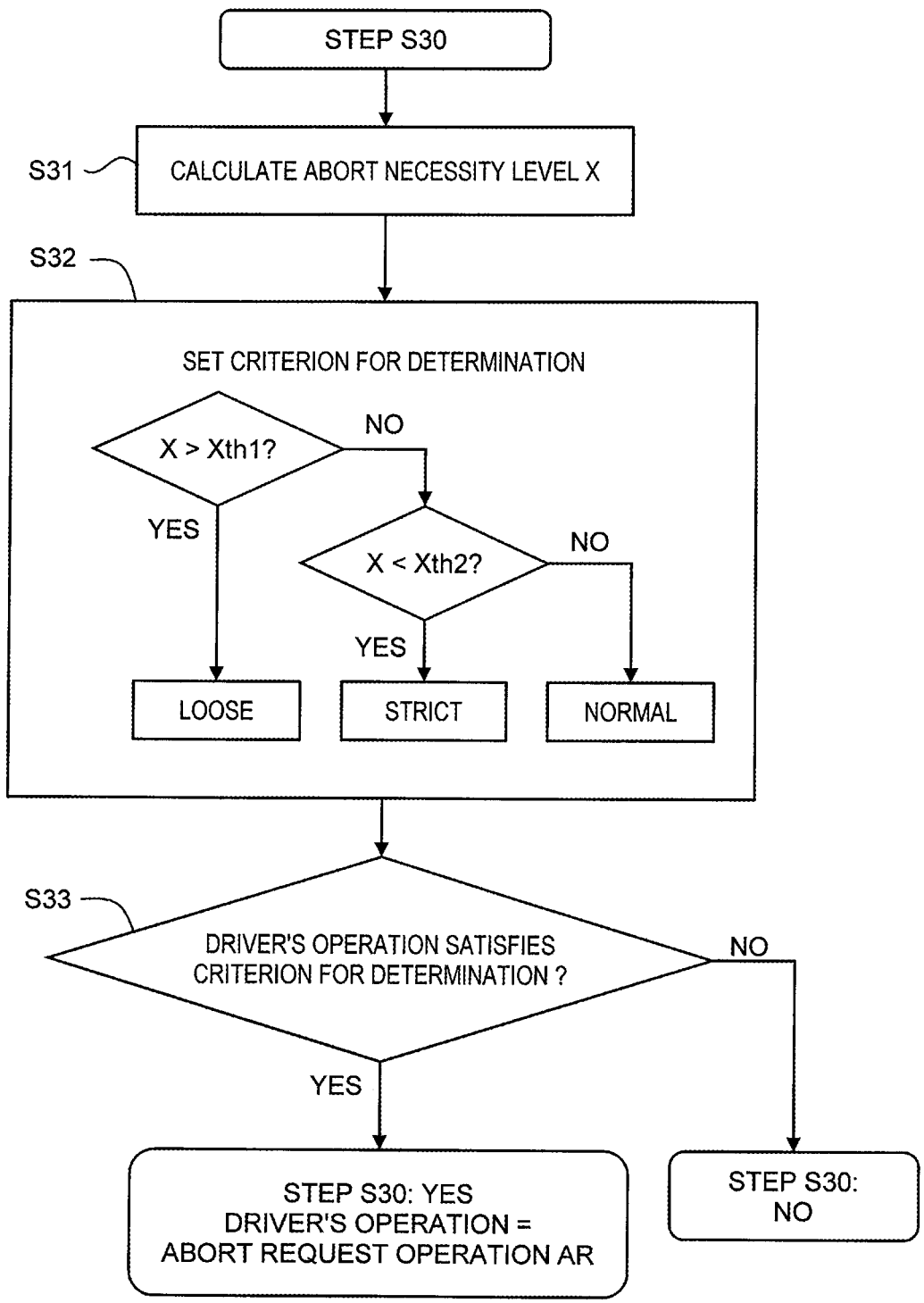
FIG. 8 is a flow chart showing Step S30 (abort request detection processing) of the lane change control processing according to the embodiment of the present disclosure.

FIG. 8 is a flow chart showing Step S30 (i.e. the abort request detection processing) according to the present embodiment.

Step S31:

Based on the driving environment information 200 indicating the driving environment for the vehicle 1, the lane change control device 100 calculates the abort necessity level X indicating necessity to abort the lane change control. Various examples can be considered as a policy of calculating the abort necessity level X. The various examples of the policy of calculating the abort necessity level X will be described later.

Step S32:

Subsequently, the lane change control device 100 sets the criterion for determination (the first determination threshold ARth1, the second determination threshold ARth2) according to the abort necessity level X. More specifically, the criterion for determination is set such that the criterion for determination becomes looser (i.e. more easily satisfied) as the abort necessity level X increases. In order to make the criterion for determination looser, the above-mentioned determination threshold (i.e. the first determination threshold ARth1, the second determination threshold ARth2) is decreased. Conversely, the criterion for determination is set such that the criterion for determination becomes stricter (i.e. less easily satisfied) as the abort necessity level X decreases. In order to make the criterion for determination stricter, the above-mentioned determination threshold (the first determination threshold ARth1, the second determination threshold ARth2) is increased.

For example, when the abort necessity level X is higher than a first level Xth1 (X>Xth1), the criterion for determination is set to be looser. When the abort necessity level X is lower than a second level Xth2 (X<Xth2), the criterion for determination is set to be stricter. Here, the second level Xth2 is lower than the first level Xth1. When the abort necessity level X is equal to or higher than the second level Xth2 and equal to or lower than the first level Xth1, the criterion for determination is set to be normal.

Step S33:

Subsequently, the lane change control device 100 refers to the driver's operation information IDO to determine whether or not the driver's operation detected by the driver's operation detection device 20 satisfies the criterion for determination. When the driver's operation satisfies the criterion for determination (Step S33; Yes), it is determined that the driver's operation is performed as the abort request operation AR (Step S30; Yes). On the other hand, when the driver's operation does not satisfy the criterion for determination (Step S33; No), the driver's operation is not determined as the abort request operation AR (Step S30; No).

For example, when the steering amount or the steering speed of the steering operation in the abort direction DAB exceeds the first determination threshold ARth1, the steering operation is determined as the abort request operation AR. As another example, when the operation duration time of the turn signal lever indicating the abort direction DAB exceeds the second determination threshold ARth2, the turn signal lever operation is determined as the abort request operation AR.

5. Various Example of Policy of Calculating Abort Necessity Level X

Hereinafter, various examples of the policy of calculating the abort necessity level X in the present embodiment will be described.

5-1. First Example

FIG. 9 is a conceptual diagram for explaining a first example of the policy of calculating the abort necessity level X. In the first example, the abort necessity level X is calculated based on the "purpose of the lane change" planned in the above-described Step S10.

For example, it is preferable to execute a lane change for lane merging or lane branching, in order for the vehicle 1 to arrive at the destination. It is also preferable to execute a lane change for avoiding an obstacle ahead of the vehicle 1, in order to secure safety of the vehicle 1. That is to say, the necessity to abort the lane change intended to the lane merging, the lane branching, or the obstacle avoidance is low. On the other hand, even when a lane change for overtaking a low-speed preceding vehicle 2 (see FIG. 1) is aborted, the autonomous driving is not so influenced.

Therefore, the abort necessity level X when the purpose of the lane change is any of the lane merging, the lane branching, and the obstacle avoidance is set to be lower than the abort necessity level X when the purpose is the overtaking. For example, an initial value of the abort necessity level X is set. Then, when the purpose of the lane change is any of the lane merging, the lane branching, and the obstacle avoidance, the lane change control device 100 decreases the abort necessity level X. As a result of the decrease in the abort necessity level X, the criterion for determination becomes stricter.

5-2. Second Example

Figure 10:
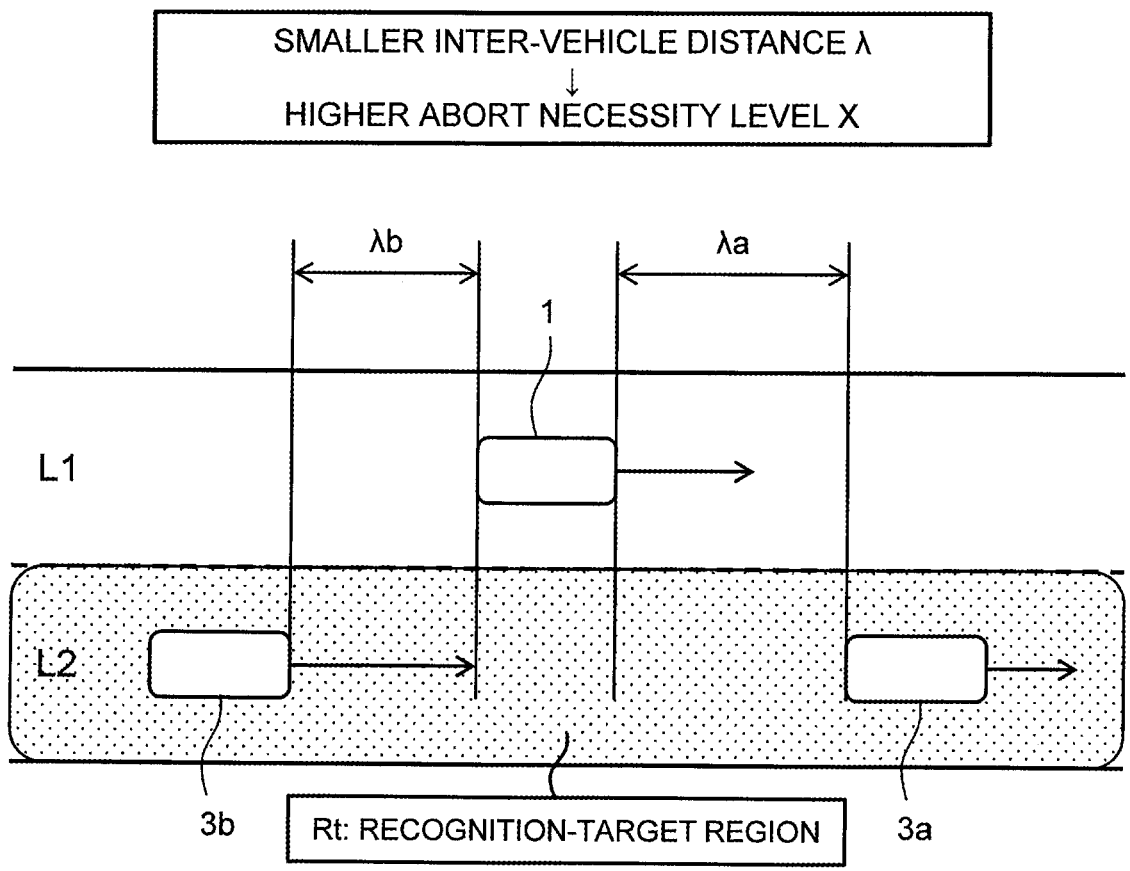
FIG. 10 is a conceptual diagram for explaining a second example of the policy of calculating the abort necessity level in the embodiment of the present disclosure.

FIG. 10 is a conceptual diagram for explaining a second example of the policy of calculating the abort necessity level X. In the second example, the abort necessity level X is calculated based on an "inter-vehicle distance k" between the vehicle 1 and a surrounding vehicle 3 traveling in the second lane L2.

For example, a surrounding vehicle 3a exists in the second lane L2 ahead of the vehicle 1. When the surrounding vehicle 3a is close, that is, when an inter-vehicle distance λa between the vehicle 1 and the surrounding vehicle 3a is small, the driver is likely to want to abort the lane change control. As another example, a surrounding vehicle 3b exists in the second lane L2 behind the vehicle 1. When the surrounding vehicle 3b is close, that is, when an inter-vehicle distance λb between the vehicle 1 and the surrounding vehicle 3b is small, the driver is likely to want to abort the lane change control.

As described above, when the inter-vehicle distance λ between the vehicle 1 and the surrounding vehicle 3 in the second lane L2 is small, the driver is likely to want to abort the lane change control. In order to appropriately pick up such the driver's intention to abort, it is preferable to loosen the criterion for determination and thus to make the driver's operation more easily determined as the abort request operation AR.

In view of the above, the lane change control device 100 refers to the sensor-detected information 230 (the target information) to calculate the inter-vehicle distance λ between the vehicle 1 and the surrounding vehicle 3 traveling in the second lane L2. More specifically, the lane change control device 100 recognizes the surrounding vehicle 3 existing in a recognition target region Rt shown in FIG. 10. The recognition target region Rt is a region of the second lane L2 and within a certain distance ahead of and behind the vehicle 1. Then, the lane change control device 100 calculates the inter-vehicle distance λ between the vehicle 1 and each surrounding vehicle 3 recognized.

The abort necessity level X when the inter-vehicle distance λ is equal to or less than a certain value is set to be higher than the abort necessity level X when the inter-vehicle distance λ exceeds the certain value. For example, an initial value of the abort necessity level X is set. Then, when the inter-vehicle distance λ is equal to or less than the certain value, the lane change control device 100 increases the abort necessity level X. The abort necessity level X may increase as the inter-vehicle distance λ becomes smaller. As a result of the increase in the abort necessity level X, the criterion for determination becomes looser.

5-3. Third Example

Figure 11:
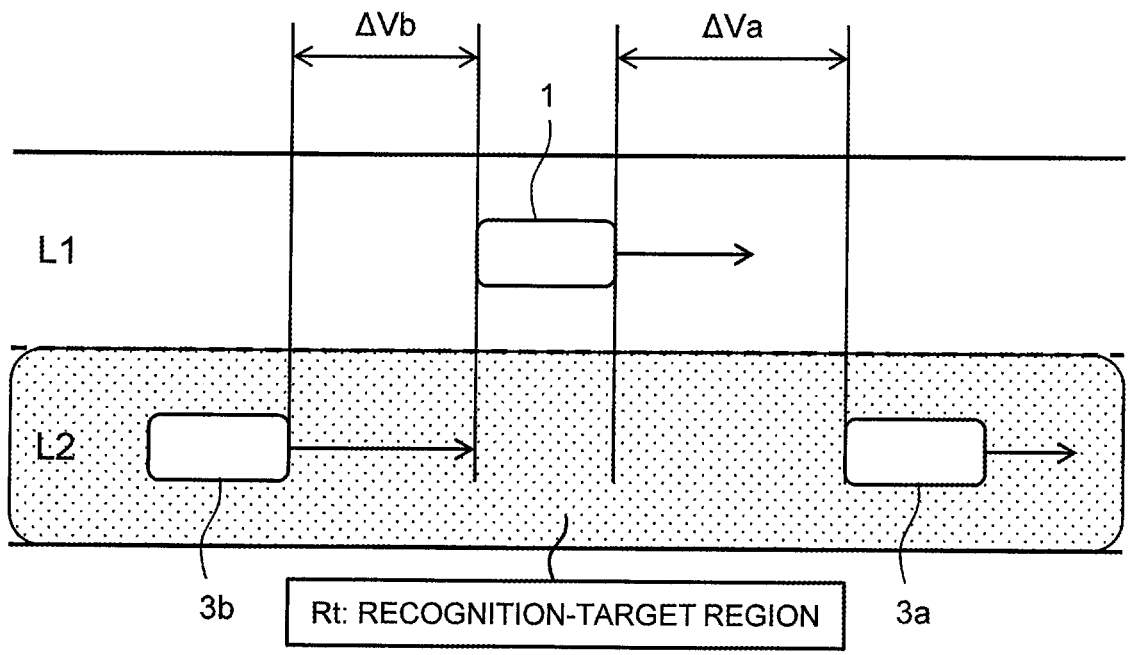
FIG. 11 is a conceptual diagram for explaining a third example of the policy of calculating the abort necessity level in the embodiment of the present disclosure.

FIG. 11 is a conceptual diagram for explaining a third example of the policy of calculating the abort necessity level X. In the third example, the abort necessity level X is calculated based on a "relative speed ΔV" between the vehicle 1 and a surrounding vehicle 3 traveling in the second lane L2.

As in the case of the second example described above, let us consider the surrounding vehicles 3a and 3b existing in the recognition target region Rt of the second lane L2. The surrounding vehicle 3a ahead of the vehicle 1 is slower than the vehicle 1, that is, a relative speed ΔVa between the vehicle 1 and the surrounding vehicle 3a is in a direction to decrease the inter-vehicle distance λa. The surrounding vehicle 3b behind the vehicle 1 is faster than the vehicle 1, that is, a relative speed ΔVb between the vehicle 1 and the surrounding vehicle 3b is in a direction to decrease the inter-vehicle distance λb.

In either case, the surrounding vehicle 3 is approaching the vehicle 1, and thus the driver is likely to want to abort the lane change control. In order to appropriately pick up such the driver's intention to abort, it is preferable to loosen the criterion for determination and thus to make the driver's operation more easily determined as the abort request operation AR.

Therefore, as in the case of the second example described above, the lane change control device 100 refers to the sensor-detected information 230 (the target information) to calculate the relative speed ΔV between the vehicle 1 and each surrounding vehicle 3 in the recognition target region Rt. When the relative speed ΔV is equal to or higher than a certain value in a direction to decrease the inter-vehicle distance λ, the lane change control device 100 increases the abort necessity level X. The abort necessity level X may increase as the relative speed ΔV increases. As a result of the increase in the abort necessity level X, the criterion for determination becomes looser.

5-4. Fourth Example

Figure 12:
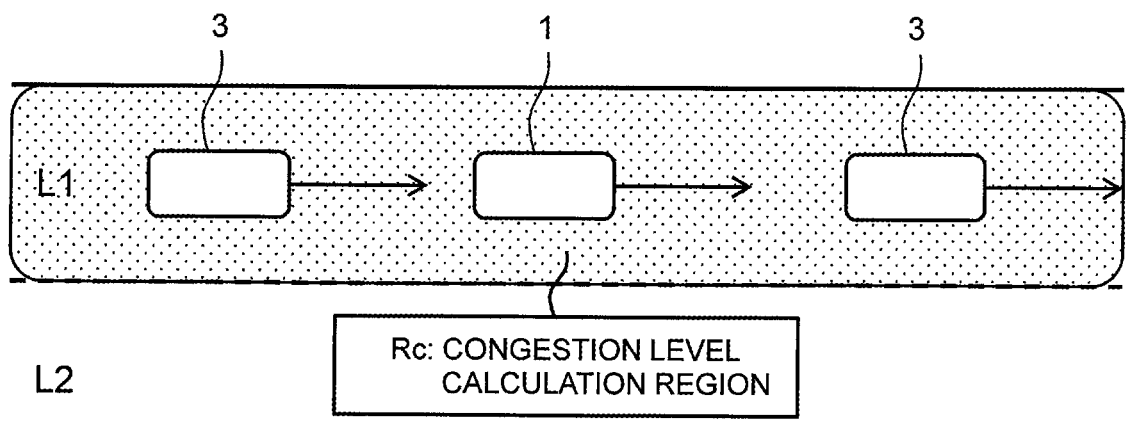
FIG. 12 is a conceptual diagram for explaining a fourth example of the policy of calculating the abort necessity level in the embodiment of the present disclosure.

FIG. 12 is a conceptual diagram for explaining a fourth example of the policy of calculating the abort necessity level X. In the fourth example, the abort necessity level X is calculated based on a "congestion level C" of a surrounding vehicle 3 in the first lane L1.

For example, the lane change control device 100 recognizes a surrounding vehicle 3 existing in a congestion level calculation region Rc that is a region within a certain distance ahead of and behind the vehicle 1. Such the surrounding vehicle 3 can be recognized based on the sensor-detected information 230 (the target information). Subsequently, the lane change control device 100 calculates an inter-vehicle distance λ between the vehicle 1 and each surrounding vehicle 3 recognized.

A minimum value of the calculated inter-vehicle distances λ is a minimum inter-vehicle distance λmin. The congestion level C is represented by reciprocal of the minimum inter-vehicle distance λmin (C=1/λmin). The congestion level C increases as the minimum inter-vehicle distance λmin decreases. Alternatively, an average inter-vehicle distance λave being an average value of the calculated inter-vehicle distances λ may be used instead of the minimum inter-vehicle distance λmin. The lane change control device 100 can calculate the congestion level C by referring to the sensor-detected information 230 (the target information).

When the congestion level C is high, it is preferable to continue the lane change control without returning the vehicle 1 to the first lane L1. That is to say, when the congestion level C is high, the abort necessity level X is low. Therefore, the lane change control device 100 decreases the abort necessity level X when the congestion level C is equal to or higher than a certain level. The abort necessity level X may decrease as the congestion level C increases. As a result of the decrease in the abort necessity level X, the criterion for determination becomes stricter.

5-5. Fifth Example

Figure 13:
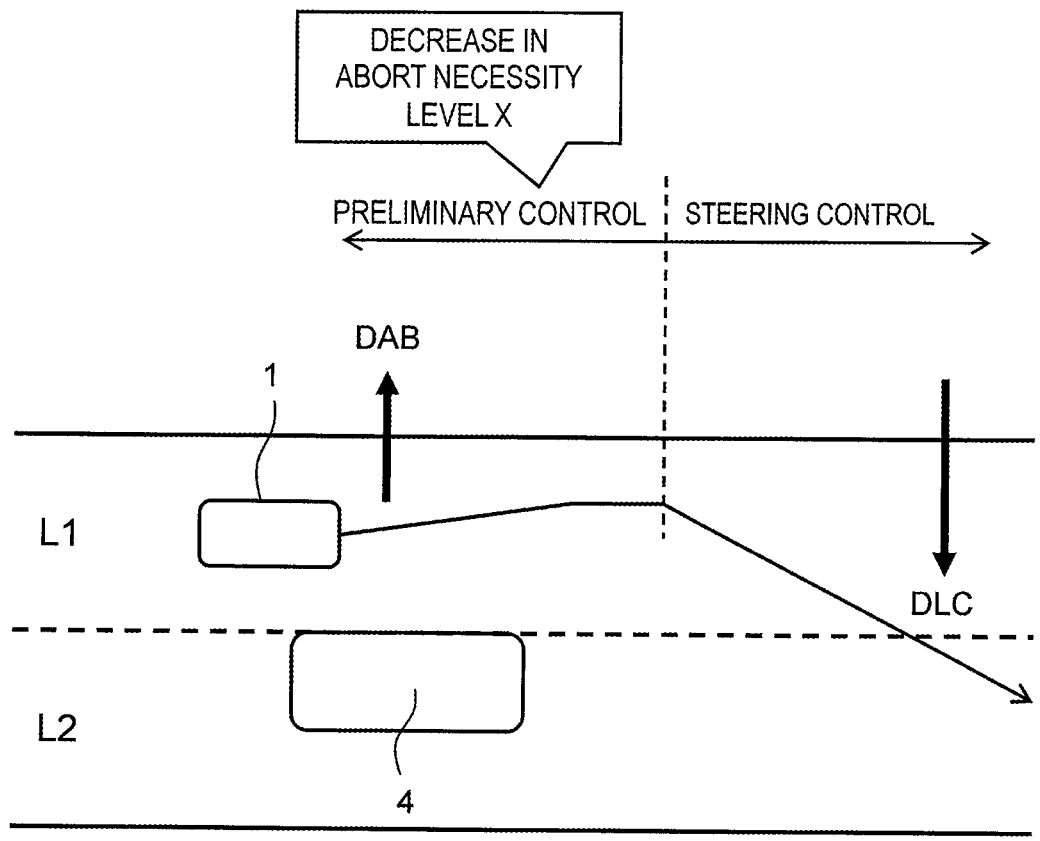
FIG. 13 is a conceptual diagram for explaining a fifth example of the policy of calculating the abort necessity level in the embodiment of the present disclosure.

FIG. 13 is a conceptual diagram for explaining a fifth example of the policy of calculating the abort necessity level X. As described above, the lane change control may include not only the steering control for moving the vehicle 1 from the first lane L1 toward the second lane L2 but also the preliminary control performed before the steering control. In the fifth example, the abort necessity level X is changed between during the preliminary control and during the steering control.

In the example shown in FIG. 13, the lane change control device 100 plans a lane change from the first lane L1 to the second lane L2, and starts the lane change control. The lane change control device 100 performs, as the preliminary control, acceleration for going ahead of a truck 4 traveling in the second lane L2 lateral to the vehicle 1. Here, let us consider a case where the truck 4 comes closer to the first lane L1. In this case, the driver may steer the steering wheel in the abort direction DAB in order to stay away from the truck 4. Such the steering operation is not intended to request to abort the lane change control but to merely stay away from the truck 4.

As described above, during the preliminary control, there is a possibility that the driver fine-tunes a travel path of the vehicle 1. The driver's operation for fine-tuning the travel path may be erroneously determined as the abort request operation AR, which is not preferable in terms of usability and operability for the driver. In view of the above, the lane change control device 100 decreases the abort necessity level X during the preliminary control. As a result of the decrease in the abort necessity level X, the criterion for determination becomes stricter and thus the driver's operation becomes less easily determined as the abort request operation AR. As a result, the error that the driver's operation for fine-tuning the travel path is erroneously determined as the abort request operation AR can be suppressed.

5-6. Sixth Example

It is also possible to combine arbitrary two or more of the above-described first to fifth examples. In this case, the lane change control device 100 increases/decreases the abort necessity level X according to each parameter.

6. Example of Step S40 (Condition Determination Processing)

Figure 14:
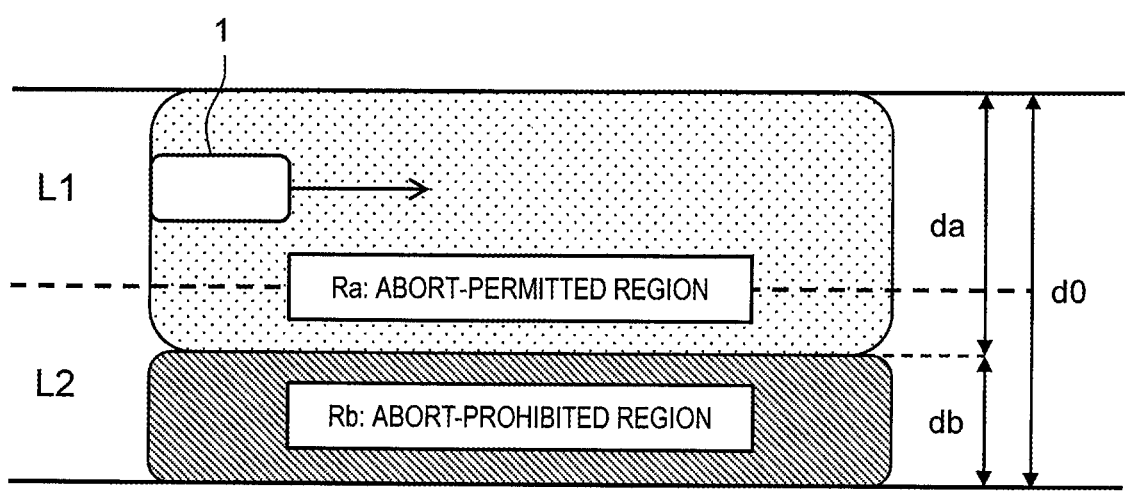
FIG. 14 is a conceptual diagram for explaining an example of Step S40 (condition determination processing) of the lane change control processing according to the embodiment of the present disclosure.

In Step S40, as described above, the lane change control device 100 determines whether or not the abort permission condition is satisfied. FIG. 14 is a conceptual diagram for explaining an example of setting of the abort permission condition. In the present example, an "abort-permitted region Ra" and an "abort-prohibited region Rb" are used. The abort-permitted region Ra is a region where abort of the lane change control is permitted. On the other hand, the abort-prohibited region Rb is a region where abort of the lane change control is not permitted.

In the example shown in FIG. 14, a sum of a width of the first lane L1 and a width of the second lane L2 is denoted by "d0". The abort-permitted region Ra is a region on the side of the first lane L1 and with a width da among the total width d0. On the other hand, the abort-prohibited region Rb is a region on the side of the second lane L2 and with a width db among the total width d0. When considering a distribution ratio r1 ($0 \leq r1 \leq 1$), the width da of the abort-permitted region Ra and the width db of the abort-prohibited region Rb are expressed by the following Equation (1).

$$da = r1 \times d0$$
$$db = d0 - da \quad \text{Equation (1):}$$

The abort permission condition is that "the vehicle 1 is inside the abort-permitted region Ra", in other words, "the vehicle 1 is outside the abort-prohibited region Rb". As the abort-permitted region Ra becomes larger, the abort permission condition becomes more easily satisfied. Conversely, as the abort-permitted region Ra becomes narrower, the abort permission condition becomes less easily satisfied.

Figure 15:
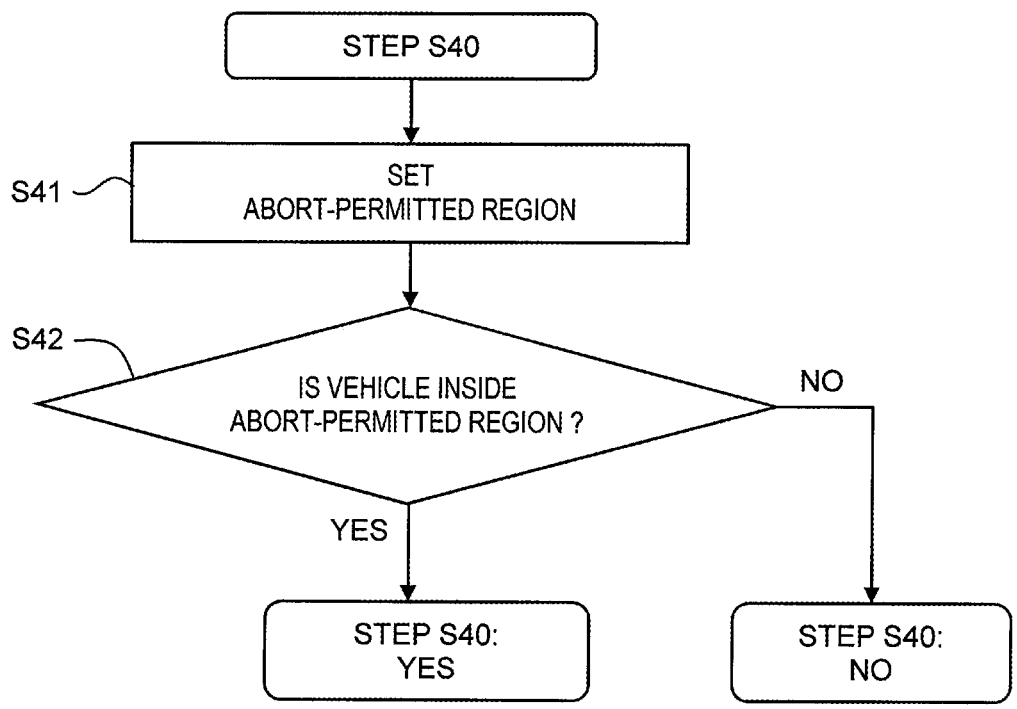
FIG. 15 is a flow chart showing the example of Step S40 (condition determination processing) of the lane change control processing according to the embodiment of the present disclosure.

FIG. 15 is a flow chart showing S40 (i.e. the condition determination processing) in the present example. First, the lane change control device 100 sets the abort-permitted region Ra (Step S41). The geometry (shape, width, etc.) of each of the first lane L1 and the second lane L2 can be obtained from the map information 220 or the sensor-detected information 230 (detected white line information).

Subsequently, the lane change control device 100 determines whether or not the vehicle 1 is inside the abort-permitted region Ra (Step S42). For example, a center position of the vehicle 1 when seen from the above is used as the position of the vehicle 1. Based on the position-orientation information 210 and the map information 220 or the sensor-detected information 230 (detected white line information), the lane change control device 100 determines whether or not the vehicle 1 is inside the abort-permitted region Ra.

When the vehicle 1 is inside the abort-permitted region Ra (Step S42; Yes), it is determined that the abort permission condition is satisfied (Step S40; Yes). On the other hand, when the vehicle 1 is not inside the abort-permitted region Ra (Step S42; No), it is determined that the abort permission condition is not satisfied (Step S40; No).

As another example, the congestion level C as explained in FIG. 12 may be used. In this case, the abort permission condition is that "the congestion level C is less than a threshold". When the congestion level C is high, it is preferable to continue the lane change control without returning the vehicle 1 to the first lane L1. Therefore, when the congestion level C is equal to or higher than the threshold, the abort permission condition is not satisfied and thus the lane change control continues.

What is claimed is:

1. An autonomous driving system mounted on a vehicle, comprising:
   an electronic control unit (ECU) including a processor programmed to:
   perform lane change control for making a lane change from a first lane to a second lane during autonomous driving of the vehicle; and
   an operation sensor that detects a driver's operation of an operation member of the vehicle,
   wherein the ECU is programmed to:
   abort request detection processing that, from start to completion of the lane change control, determines whether or not the driver's operation is performed as an abort request operation that requests to abort the lane change control; and
   abort processing that, when the abort request operation is performed and an abort permission condition is satisfied, aborts the lane change control and makes the vehicle travel in the first lane,
   wherein in the abort request detection processing, the ECU:
   calculates abort necessity level indicating necessity to abort the lane change control, based on driving environment information indicating driving environment for the vehicle;

sets criterion for determination such that the criterion for determination becomes more easily satisfied as the abort necessity level increases; and when the driver's operation satisfies the criterion for determination, determines that the driver's operation is performed as the abort request operation.

2. The autonomous driving system according to claim 1, wherein:

based on the driving environment information, the ECU is further programmed to:

plan the lane change and calculate the abort necessity level based on a purpose of the planned lane change; and decrease the abort necessity level when the purpose is any of lane merging, lane branching, and obstacle avoidance.

3. The autonomous driving system according to claim 1, wherein:

the driving environment information includes sensor-detected information indicating information of a surrounding vehicle detected by a sensor;

the ECU is further programmed to:

refer to the sensor-detected information to calculate the abort necessity level based on an inter-vehicle distance between the vehicle and the surrounding vehicle traveling in the second lane; and increase the abort necessity level when the inter-vehicle distance is equal to or less than a certain value.

4. The autonomous driving system according to claim 1, wherein:

the driving environment information includes sensor-detected information indicating information of a surrounding vehicle detected by a sensor;

the ECU is further programmed to:

refer to the sensor-detected information to calculate the abort necessity level based on a relative speed between the vehicle and the surrounding vehicle traveling in the second lane; and increase the abort necessity level when the relative speed is equal to or higher than a certain value in a direction to decrease an inter-vehicle distance between the vehicle and the surrounding vehicle traveling in the second lane.

5. The autonomous driving system according to claim 1, wherein:

the driving environment information includes sensor-detected information indicating information of a surrounding vehicle detected by a sensor;

the ECU is further programmed to:

refer to the sensor-detected information to calculate the abort necessity level based on a congestion level of the surrounding vehicle in the first lane; and decrease the abort necessity level when the congestion level is equal to or higher than a certain level.

6. The autonomous driving system according to claim 1, wherein the lane change control includes:

steering control that moves the vehicle from the first lane toward the second lane; and preliminary control performed before the steering control, wherein during the preliminary control, the ECU decreases the abort necessity level.

7. The autonomous driving system according to claim 1, wherein:

a direction from the second lane to the first lane is an abort direction;

the operation member includes a steering wheel;

the abort request operation is to steer the steering wheel in the abort direction;

the criterion for determination is that a steering amount of a steering speed of the steering wheel exceeds a first determination threshold; and when making the criterion for determination more easily satisfied, the ECU decreases the first determination threshold.

8. The autonomous driving system according to claim 1, wherein:

a direction from the second lane to the first lane is an abort direction;

the operation member includes a turn signal lever;

the abort request operation is to operate the turn signal lever to indicate the abort direction;

the criterion for determination is that an operation duration time of the turn signal lever exceeds a second determination threshold; and when making the criterion for determination more easily satisfied, the ECU decreases the second determination threshold.

\* \* \* \* \*